United States Patent
Williams

(10) Patent No.: US 6,852,170 B1
(45) Date of Patent: Feb. 8, 2005

(54) MOUSE CLEANING APPARATUS AND METHOD

(75) Inventor: Glenn L. Williams, Bay Village, OH (US)

(73) Assignee: The United States of America as represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/264,189

(22) Filed: Oct. 3, 2002

(51) Int. Cl.[7] .................................. B08B 7/04
(52) U.S. Cl. ............................... 134/6; 134/42
(58) Field of Search ..................... 134/6, 7, 8, 42; 15/104.002

(56) References Cited

U.S. PATENT DOCUMENTS

| | | | |
|---|---|---|---|
| 3,400,421 A | 9/1968 | Nappi et al. | |
| 3,501,797 A | * 3/1970 | Nappi | 15/215 |
| 3,717,897 A | 2/1973 | Amos et al. | |
| 3,785,102 A | 1/1974 | Amos et al. | |
| 4,107,811 A | * 8/1978 | Imsande | 15/215 |
| 4,128,909 A | 12/1978 | Kawabe et al. | |
| 4,143,194 A | 3/1979 | Wihksne | |
| 4,673,440 A | 6/1987 | Chapin, Jr. | |
| 4,760,618 A | 8/1988 | Chapin, Jr. | |
| 5,018,235 A | * 5/1991 | Stamatiou et al. | 15/215 |
| 5,153,254 A | 10/1992 | Chen | |
| 5,486,845 A | 1/1996 | Chait | |
| 5,519,910 A | 5/1996 | Messina | |
| 5,615,438 A | 4/1997 | Field | |
| 5,850,661 A | 12/1998 | Lawrence | |
| 5,919,562 A | 7/1999 | Root | |
| 5,968,644 A | 10/1999 | Lai | |
| 5,970,559 A | 10/1999 | Christy | |
| 5,985,042 A | 11/1999 | Fielder | |
| 6,043,808 A | 3/2000 | Perry | |
| 6,129,092 A | 10/2000 | Mondl et al. | |
| 6,185,778 B1 | 2/2001 | Ornstedt | |
| 6,196,898 B1 | 3/2001 | Naghi et al. | |
| 6,264,756 B1 | 7/2001 | Boys | |
| 6,265,332 B1 | 7/2001 | Yoshida et al. | |
| 6,383,607 B1 | 5/2002 | Shin | |
| 6,458,442 B1 | * 10/2002 | McKay | 428/40.1 |

* cited by examiner

Primary Examiner—Michael Barr
Assistant Examiner—Saeed Chaudhry
(74) Attorney, Agent, or Firm—Kenneth L. Mitchell; Kent N. Stone

(57) ABSTRACT

The method of using the mouse pad cleaning apparatus is disclosed and claimed. The method comprises the steps of uncovering the mouse cleaning surface, applying the mouse and ball of the mouse to the cleaning surface, moving the mouse in a rotational pattern on the mouse cleaning surface, removing the mouse form the mouse cleaning surface, washing the cleaning surface, and covering the mouse cleaning surface. A mouse pad cleaning apparatus comprising a plurality of substrates, each said substrate having adhesive thereon, said plurality of substrates residing in and affixed to a receptacle. A single substrate having adhesive, which may be washable or non-washable, thereon may be employed. The washable adhesive may be an organopolysiloxane or gelatinous elastomer.

11 Claims, 6 Drawing Sheets

MOUSE CLEANING APPARATUS AND METHOD

ORIGIN OF THE INVENTION

The invention described herein was made by an employee of the United States Government, and may be manufactured and used by the government for government purposes without the payment of any royalties therein and therefor.

FIELD OF THE INVENTION

A method and apparatus for cleaning a computer mouse to remove dust, lint, skin, hair, food and debris which prevent the ball from rolling freely and complicate the operation of the computer graphical user interface.

BACKGROUND OF THE INVENTION

The standard computer mouse having a roller ball on the bottom side tends to collect dust and lint or particles which eventually impede the smooth movement of the ball. The mouse when placed on a surface such as a mouse pad forces the roller ball into a recess or cavity. That recess or cavity is opened and exposed when the ball recedes into the cavity and food, lint, dust, particulates from cigarette smoke and the like resident on the mouse pad or mouse bottom is introduced into the mouse. A typical mouse translates the spherical rotation of the mouse ball into rotational movement of transducers in the mouse. These transducers or pickups may further employ springs and the like as part of the mechanism. When these transducers become fouled with dirt, dust, skin, food hair or the like they don't work well and the mouse becomes difficult to work resulting in erratic positioning of the cursor. Sometimes chemicals and/or solvents may be used in cleaning the transducers.

When the mouse is in use then dirt, hair, food and other contaminants resident on the mouse pad are likely to be carried by the mouse ball into the cavity of the mouse and foul the delicate mechanisms which translate the movement of the mouse into the movement of the cursor on the screen of the computer.

The resulting action of a dirty mouse ball on the screen of the computer is a cursor which cannot be steered properly to the desired location on the screen without a lot of extra motions. Cleaning of the mouse involves taking off the small guard on the bottom of the mouse, dropping out the ball and then manually removing debris from the ball. Sometimes the rollers within the cavity of the mouse must be cleaned as dirt accumulates therein absent maintenance of a clean mouse ball. This cleaning action often means disturbing the work in progress on the computer because false signals emanate from the mouse during the time the mouse is being removed or reinstalled or because the mouse buttons are accidentally bumped during the cleaning operation.

The mouse buttons are used to click on an icon or image on the screen of the computer. False signals make the cursor move around in an undesired fashion or may cause actuation of undesirable events in the computer operating system such as shutting the computer down.

Others have used a frame with a well therein for cleaning the mouse. Others have also provided cleaning apparatuses in which the ball must be removed from the mouse before cleaning and then a probe is inserted into the mouse for removing unwanted contaminants and debris. The cleaning devices, when inserted into the cavity of the mouse and in contact with the transducers and the positioning device, may damage the transducers or the positioning device.

U.S. Pat. No. 5,519,910 to Messina issued May 28, 1996 discloses a mouse ball cleaning device wherein the bottom side of the mouse resides adjacent a cardboard overpiece and the ball of the mouse is permitted to drop down into a well which, at the bottom thereof, has adhesive film 16 mounted on a base piece of cardboard. The bottom of the mouse never touches or engages the adhesive. The '910 is incorporated herein by reference hereto and provides a background of the problems faced in the use and cleaning of a computer mouse.

U.S. Pat. No. 3,717,897 to Amos describes a tacky floor mat having washable adhesive thereon. The adhesives used in the '897 patent to Amos are insoluble in water, truly resilient, and must be soft enough to conform easily to the shape of the adherend, i.e., a foot or shoe of a person. The disclosure of the '897 patent is incorporated herein by reference.

U.S. Pat. No. 3,785,102 to Amos describes a tacky floor pad which includes a stack of plastic sheets having adhesive on the top sides thereof. The first sheet includes adhesive on the bottom side thereof for securing the stack to the floor and the edges of the stack are beveled so as to prevent undesirable tear-up of the thin plastic sheets. Adhesive on top of each layer of the stack of plastic sheets extends beyond the sheet above it to further prevent unwanted tear-up of the thin plastic sheets. The disclosure of the '102 patent is incorporated herein by reference.

U.S. Pat. No. 6,129,092 to Mondl et al. provides a good discussion of the prior art and the problems associated with contamination of a mouse. Further, Mondl et al. discloses a cleaning mouse ball for temporary insertion into a mouse which together with solvents cleans the transducers and positioning or tensioning rollers within a typical mouse cavity.

U.S. Pat. No. 4,128,909 to Kawabe et al. and 5,153,254 to Chen disclose washable adhesives and the disclosure of each is incorporated herein by reference. The '909 patent discloses a record cleaner in the shape of a roller having an organopolysiloxane elastomer surface. The '254 patent discloses a washable gelatinous elastomer composition for use in cleaning a computer mouse. Col. 3, Ins. 28–31 of the '254 patent state that the lint remover can take on many shapes such as a swab and in various forms for cleaning a computer mouse.

U.S. Pat. No. 6,265,332 B1 to Yoshida et al. discloses a mouse pad comprising an adhesive laminate of a fibrous sheet made of ultrafine fibers to a substrate.

U.S. Pat. No. 5,968,644 to Lai discloses a mouse device pad wherein the bottom layer of the device is constructed of a thin body of polyvinyl chloride (PVC) compound foam that is pliant and has a certain degree of adhesiveness with a knitted fabric having similar soft and flexible properties glued onto the top of the PVC layer such that when the aforesaid mouse device pad is placed on the surface of a desk for mouse device operation, the PVC compound foam of the bottom layer is capable of providing greater stiction to prevent unwanted movement of the mouse pad.

U.S. Pat. No. 5,919,562 to Root discloses a washable adhesive which secures the mouse pad to its mounting surface.

The invention described herein requires no disassembly of the mouse and does not require a hole or trough in which to place the mouse or ball for cleaning. The invention described herein cleans a mouse and mouse ball in less than 15 seconds whereas the state of the art inventions require considerably longer cleaning times because of the need to disassemble the mouse or align the ball of the mouse into the trough.

A better understanding of the invention will be had when reference is made to the Summary Of The Invention, Drawings, Brief Description Of The Drawings, Description Of The Invention and claims which follow hereinbelow.

SUMMARY OF THE INVENTION

The invention comprises three components: (1) a stack of one or more sheets of slightly tacky material, (2) a frame to hold the stack of sheets, and (3) an optional protective cover sheet which keeps dust off the top-most tacky sheet during periods of non-usage. All of the materials may be fabricated with recyclable materials, e.g., plastics. A sheet of slightly tacky material resembles a piece of masking tape. The definition of tacky is that the adhesive maintains the same degree of tackiness as the common lint roller found in retail stores. The adhesive may be a washable adhesive as set forth below. A stack of sheets is convenient to use so that when the top sheet is dirty, it can be peeled off and discarded. The stack of sheets must not be so high that it tends to delaminate from shear forces during use. Use of the stack of sheets in a container such as a box having a cover prevents the delamination.

The use of the invention is as follows. The entire unit is held in one hand or set on a work surface next to the mouse. The protective cover is removed. The computer mouse is then placed onto the top-most tacky sheet as if the tacky sheet is a mouse pad and then the mouse is dragged around the pad in the same manner as on a real mouse pad. Depending on the size of the tacky sheets used the mouse may be rotated in a circular fashion or in orbits on the mouse pad. In a few seconds (usually 10–15 seconds) of circular motion the dust, lint, skin, and hair which has been picked up by the mouse residing on the bottom of the mouse and on the mouse ball is removed and held captive by the tacky layer on the sheet. None of the adhesive transfers to the mouse or mouse ball to interfere with future operation of the mouse.

The method of using the mouse pad cleaning apparatus comprises the steps of uncovering the mouse cleaning surface, applying the mouse and ball of the mouse to the cleaning surface, moving the mouse in a rotational pattern on the mouse cleaning surface, removing the mouse form the mouse cleaning surface, washing the cleaning surface, and covering the mouse cleaning surface. The step of washing the cleaning surface may be eliminated if a non-washable adhesive is used. Washing may be performed with soap and/or water. Likewise, the steps of covering and uncovering the cleaning surface are optional.

It is an object of the present invention to provide a mouse cleaning apparatus and method which is easy and quick to use.

It is an object of the present invention to provide a mouse cleaning apparatus which includes a plurality of sheets having adhesive on one side thereof and which resides in a frame or box. Optionally, the box may have a cover and/or the cover may simply be a used sheet.

It is an object of the present invention to provide an inexpensive mouse cleaning apparatus made of recyclable materials such as paper and/or plastic.

It is an object of the present invention to enhance the operation of a computer so as to minimize false signals from a computer mouse.

It is an object of the present invention to provide a mouse cleaning apparatus made of a single substrate having a washable adhesive thereon. The washable adhesive may be an organopolysiloxane elastomer or a gelatinous elastomer.

A better understanding of the instant invention will be had when reference is made to the Brief Description Of The Drawings and claims which follow herein below.

A better understanding of the drawings will be had when reference is made to the Description Of The Invention and claims which follow hereinbelow.

DESCRIPTION OF THE INVENTION

Figure 1:
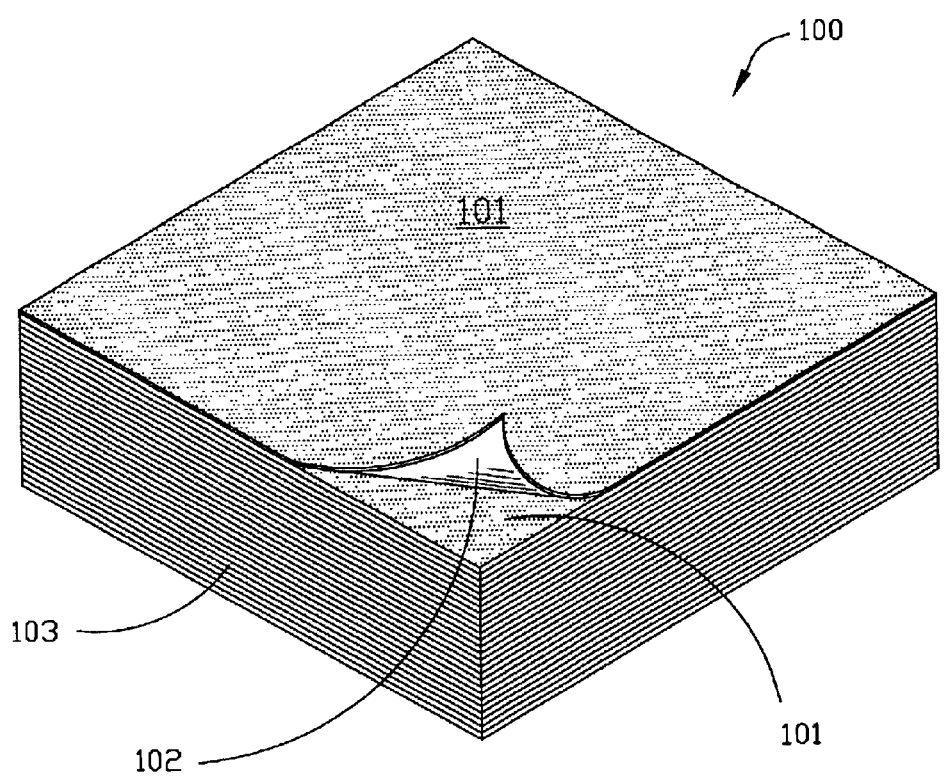
FIG. 1 is a perspective view 100 of a stack of laminated layers having adhesive coated entirely on one side thereof.

FIG. 1 is a perspective view 100 of a stack 103 of laminated layers having adhesive 101 coated entirely on one side thereof.

Figure 2:
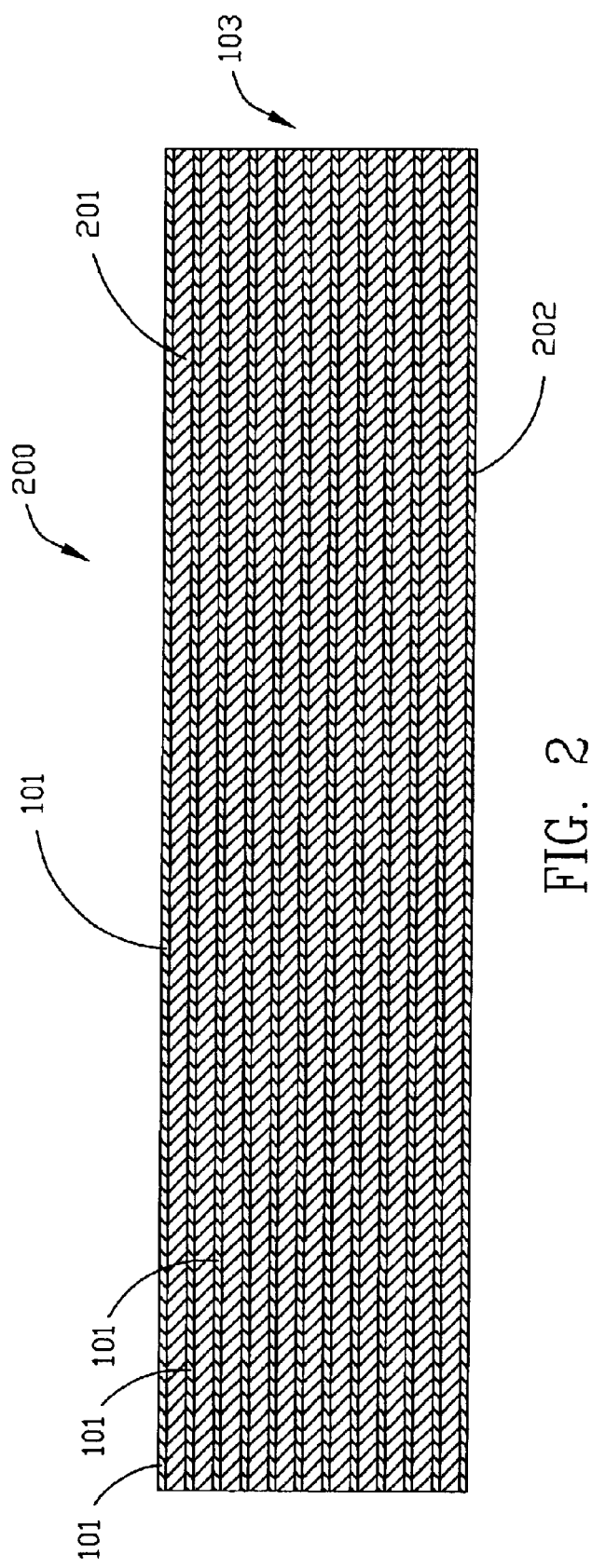
FIG. 2 is a cross-sectional view of the stack of laminated layers of FIG. 1.

FIG. 2 is a cross-sectional view 200 of the stack 103 of laminated layers of FIG. 1. One layer comprises a substrate 201 coated with a washable adhesive 101 such as that disclosed in U.S. Pat. No. 4,128,909 to Kawabe et al. and U.S. Pat. No. 5,153,254 to Chen. Bottom surface 102 of the top layer 101/201 is releasable from adhesive 101 on the next layer down in the stack. The substrates 201 can be made out of thin plastics, paper, or cardboard. The stack 103 of layers can be as high as desired so long as the shear forces of the stack do not cause delamination. In normal circumstances this will not happen as there is no reason for employing a super high stack.

The bottom layer which is a combination of adhesive and substrate has adhesive 202 on the bottom side thereof enabling the stack to be secured to a surface such as a desk or table. Alternatively, the stack may be used in combination with a receptacle such as a box as illustrated in FIGS. 3, and 4.

Figure 3:
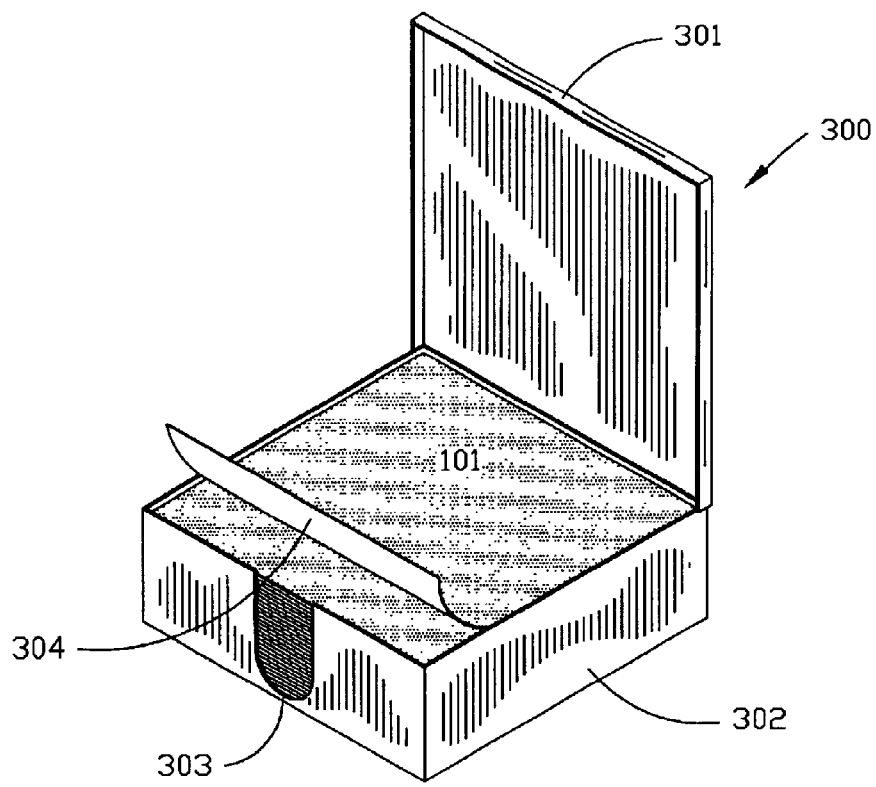
FIG. 3 is a perspective view of a box having a stack of laminated layers therein. A thumb or finger hole provides access for removal of a used layer.
Figure 5:
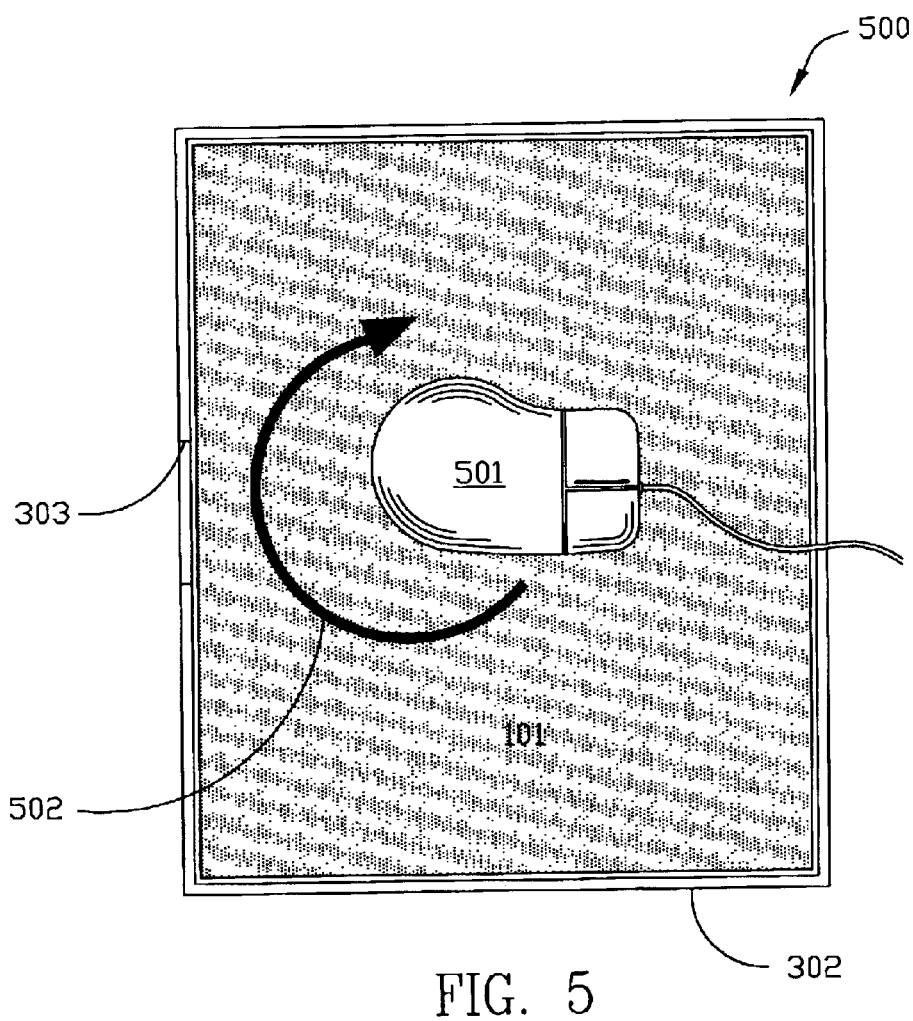
FIG. 5 is a top view of the box, a mouse and an adhesive bearing layer.

FIG. 3 is a perspective view of a box or receptacle 302 having a stack 103 of laminated layers therein. A thumb or finger hole 303 provides access for removal of a used layer 101/201 which is then discarded or recycled. Receptacle 302 may optionally include a cover 301 whose function, when closed, is to keep the adhesive layer 101 clean and free from dirt and contamination. Receptacle 302 may have any shape desired as long as enough surface area of the adhesive 101 is provided such that the mouse 501 as illustrated in FIG. 5 may move be rotated in a circular pattern. Those skilled in the art will recognize that the cover 301 does not have to be hinged to the receptacle 302.

Figure 4:
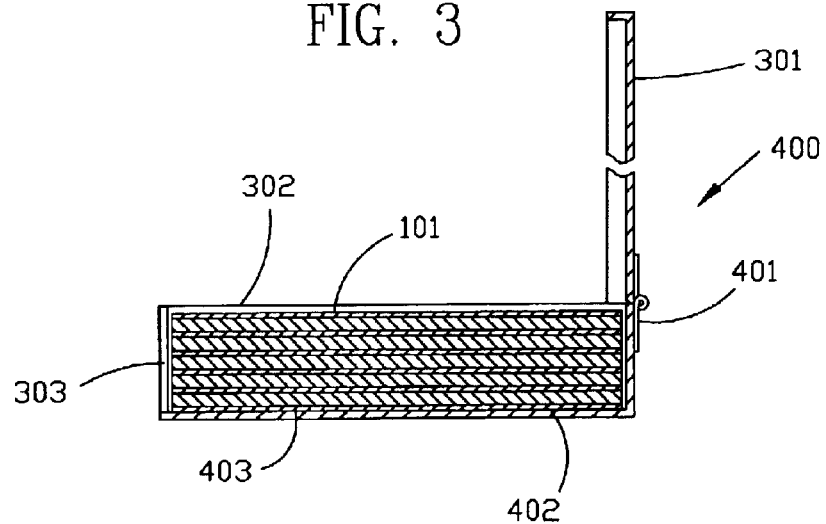
FIG. 4 is a cross-sectional view of the box of FIG. 3 illustrating the hinged top cover. Alternatively, the bottom layer of the stack of laminated layers may contain adhesive on the bottom side thereof so as to secure it and layers above it to the box.

Referring to FIG. 4, reference numeral 303 indicates an aperture such as a finger or thumb hole in receptacle 302 which enables easy removal of a layer 101/201 of adhesive coated substrates. Reference numeral 304 indicates the lifting of a layer 101/201 from the stack 103 of layers. Once a portion of the substrate is lifted it is easily peeled from the adhesive on the top layer of the substrate beneath it. Preferably, a removable adhesive 101 is used.

FIG. 4 is a cross-sectional view of the box of FIG. 3 illustrating the hinged 401 top cover. Alternatively, the box may contain adhesive in the bottom thereof so as to secure the layers thereto. Or, as set forth above the bottom substrate 403 may have adhesive 202 on the bottom side thereof. FIG. 5 is a top view 500 of the box or receptacle 302, a mouse 501 and an adhesive 101 bearing layer 101/201.

It has been discovered that circular rotation of the mouse on the adhesive 101 for a period of 10 to 15 seconds a day every other day keeps the mouse and mouse ball clean and free from debris and dirt. Depending on the stiffness of the substrates used, the layers 101/201 may be slightly depressable depending on the amount of force used during the cleaning procedure.

Referring to FIG. 4, a bottom layer of adhesive 202 resides on the bottom or base substrate 403 to secure the stack 103 to the bottom 402 of the receptacle 302. If the receptacle is not used and the stack resides on a desk top surface, for instance, the adhesive 202 prevents the stack from slipping and moving on the surface. If just a stack having a single substrate, (i.e., the bottom substrate) with adhesive 101 on the top side thereof is used alone and outside of receptacle 302, it is particularly advisable to use the adhesive layer 202. Use of the substrates, including the bottom substrate 403, in a receptacle does not mandate use of adhesive 202 on the bottom side of bottom substrate 403 because the receptacle itself will prohibit movement of the substrate (s) withing the receptacle.

Use of a mouse on a layer 101/201 of the instant invention results in the bottom 604 of the mouse 501 being cleaned by the adhesive 101. A typical mouse 501 employs a ball 602 for operation in contact with a mouse pad (not shown). The bottom configurations of commercially available mice (mouses) varies from mouse to mouse. Usually some mechanism to release the ball 602 is employed. See, U.S. Pat. No. 5,486,845 to Chait wherein a gasket is employed in an attempt to prohibit the introduction of dirt inside the cavity of the mouse. Also see, U.S. Pat. No. 6,129,092 to Mondl et al., FIG. 3 thereof, illustrating the retaining structure of the mouse ball.

These mechanisms and the grips used to remove (i.e., turn to unlock) the mouse balls can themselves be a source and storage reservoir for trapped debris such as dirt, dead skin, food and a host of other contaminants. As the mouse is used on the mouse pad, some of the contaminants may break free from storage in the mouse sub components and be dragged into the cavity of the mouse. When the instant invention is employed as set forth in FIG. 6, the entire bottom of the mouse engages the adhesive 101 on a layer 101/201. In this way, the bottom of the mouse is cleaned lessening the chance of dirt being released from a crevice in the bottom of the mouse structure and entering the mouse cavity to foul the transducers and positional or tensioning device.

Figure 6:
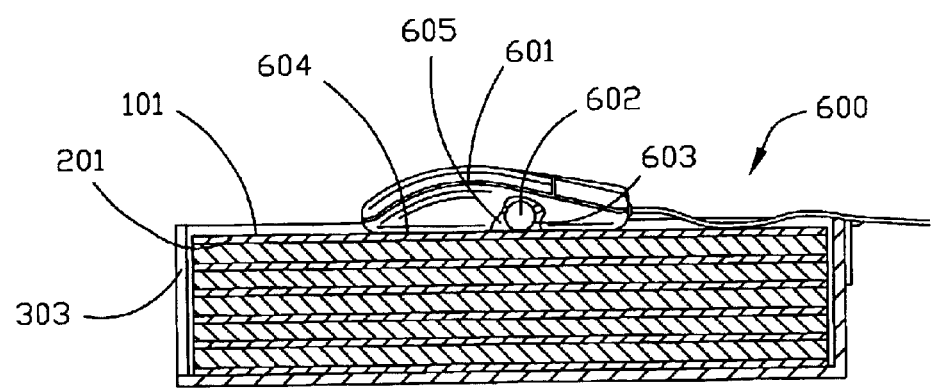
FIG. 6 is a cross-sectional view of the box as set forth in FIG. 5 together with a plan view of a mouse.

FIG. 6 is a cross-sectional view 600 of the box as set forth in FIG. 5 together with a plan view of a mouse 601. A cutaway view 605 shows the mouse ball 602 in rolling position on adhesive layer 101. Reference numeral 603 indicates the point contact of the mouse ball 602 on the adhesive 101. The point contact, depending upon the rigidity of the substrate 201 and the thickness and tackiness of the adhesive employed, may actually be a segment of the surface of a sphere. It has been discovered that rotational movement 502 of the mouse 501 for 10 to 15 seconds every other day keeps the mouse ball 602 and the cavity clean and trouble free.

It will be noted that those skilled in the art will readily recognize that a single layer 101/201 with adhesive 202 on the layer may be affixed to a surface such as a table or a desk and used by itself and not in a stack as disclosed herein. This is especially true where, as here, washable adhesives as taught in the references above are used. Additionally, a single layer 101/201 may be used on an inclined plane which may ease use of the invention and lessen stress on the user's wrist.

Figure 7:
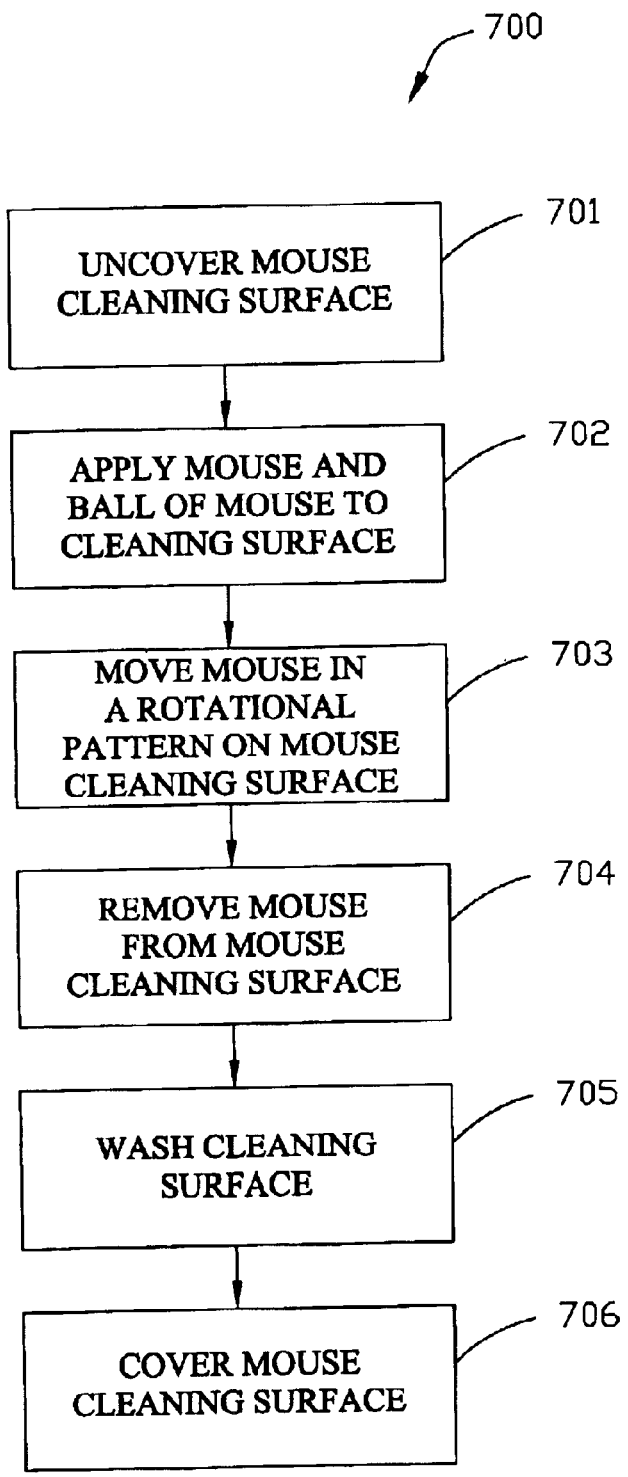
FIG. 7 is a diagrammatic view of the process steps of cleaning a mouse. Alternatively, the step of washing the cleaning surface may be eliminated if non-washable adhesive is used.
Figure 8:
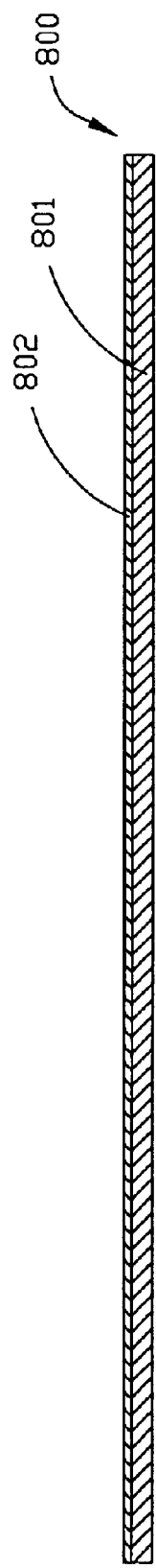
FIG. 8 is a cross-sectional view of a single substrate having adhesive, which may be washable or non-washable, thereon.

FIG. 7 is a diagrammatic view 700 of the process steps of cleaning a mouse, comprising the steps of: uncovering a mouse cleaning surface 701, applying the bottom of a mouse and ball of the mouse to a cleaning surface 702, moving the mouse in a rotational pattern on the mouse cleaning surface 703, removing the mouse from the cleaning surface 704, washing the cleaning surface 705, and, covering the cleaning surface 706. The steps of uncovering and covering the mouse cleaning surface is optional. Washing the surface will only be necessary if the adhesive is washable. FIG. 8 is a cross-sectional view of a single substrate having adhesive, which may be washable or non-washable, thereon.

The instant invention has been described herein in detail and with specificity. Those skilled in the invention will readily recognize that changes and modifications may be made to the foregoing invention as described herein without departing from the spirit and scope of the appended claims.

I claim:

1. A method of cleaning a mouse having a ball utilizing an adhesive covered planar cleaning surface having a surface area which exceeds the area of said mouse and said ball enabling said mouse and said ball to be freely moved thereabout said surface, comprising the steps of:

applying said mouse and ball of said mouse to a said adhesive covered planar cleaning surface;

moving said mouse and said ball on said mouse adhesive covered planar cleaning surface, wherein said mouse and ball of said mouse simultaneously contact said adhesive covered planar cleaning surface; and, removing said mouse and said ball from said adhesive covered planar cleaning surface.

2. A method of cleaning a mouse as claimed in claim 1 further comprising the step of washing said adhesive covered planar cleaning surface, and said step is performed with soap and water.

3. A method of cleaning a mouse as claimed in claim 1 wherein said step of moving said mouse and said ball on said adhesive covered planar cleaning surface is performed by moving said mouse and said ball in a rotational pattern on said adhesive covered planar cleaning surface.

4. A method of cleaning a mouse as claimed in claim 3 wherein said mouse and said ball are moved in a rotational pattern for 10 to 15 seconds.

5. A method of cleaning a mouse having a ball utilizing an adhesive covered planar cleaning surface having a surface area which exceeds the area of said mouse and said ball enabling said mouse and said ball to be freely moved thereabout said surface, comprising the steps of:

uncovering the adhesive covered planar cleaning surface;

applying said mouse and ball of said mouse to said adhesive covered planar cleaning surface, wherein said mouse and ball of said mouse simultaneously contact said adhesive covered planar cleaning surface;

moving said mouse and said ball in a rotational pattern on said adhesive covered planar cleaning surface;

removing said mouse and said ball from said adhesive covered planar cleaning surface;

washing said adhesive covered planar cleaning surface; and, covering said adhesive covered cleaning surface.

6. A method of cleaning a mouse having a ball as claimed in claim 5 wherein said step of applying said mouse and said ball of said mouse to an adhesive covered planar cleaning surface includes applying the bottom of said mouse to a said adhesive covered planar cleaning surface.

7. A method of cleaning a mouse having a ball as claimed in claim 6 wherein said adhesive is an organopolysiloxane elastomer.

8. A method of cleaning a mouse having a ball as claimed in claim 6 wherein said adhesive is a gelatinous elastomer.

9. A method of repetitively cleaning a mouse having a ball, utilizing a plurality of adhesive covered planar cleaning surfaces residing in a receptacle having a cover, each one of said plurality of adhesive covered planar cleaning surfaces having a surface area which exceeds the area of the bottom of the mouse and said ball enabling said bottom of said mouse and said ball to be freely moved thereabout said surface, each one of said plurality of adhesive covered planar cleaning surfaces being removably bonded to the next adjacent adhesive covered planar cleaning surfaces, comprising the steps of:

uncovering said receptacle and exposing an adhesive covered planar cleaning surface;

applying said mouse and ball of said mouse to said adhesive covered planar cleaning surface, wherein said mouse and ball of said mouse simultaneously contact said adhesive covered planar cleaning surface;

moving said mouse and said ball in a rotational pattern on said adhesive covered planar cleaning surface;

removing said mouse and said ball from said adhesive covered planar cleaning surface;

covering said receptacle;

repeating the aforementioned steps until said adhesive covered planar cleaning surface is no longer effective; and, removing said ineffective adhesive covered planar cleaning surface and exposing the next adjacent adhesive covered planar cleaning surface.

10. A method of repetitively cleaning a mouse having a ball as claimed in claim 9 wherein said plurality of adhesive covered planar surfaces are affixed to said receptacle by adhesive.

11. A method of repetitively cleaning a mouse having a ball as claimed in claim 9 wherein said receptacle includes an opening to enable removal of an adhesive covered planar cleaning surface without having to remove all of said adhesive covered planar surfaces from said receptacle.

* * * * *

UNITED STATES PATENT AND TRADEMARK OFFICE
CERTIFICATE OF CORRECTION

PATENT NO. : 6,852,170 B1
DATED : February 8, 2005
INVENTOR(S) : Glenn L. Williams It is certified that error appears in the above-identified patent and that said Letters Patent is hereby corrected as shown below:

Column 6,
Line 42, after "mouse to" delete "a".

Signed and Sealed this

Twenty-fourth Day of May, 2005

JON W. DUDAS
*Director of the United States Patent and Trademark Office*